March 14, 1961
H. H. TALBOYS
2,974,607
TRACK SURFACING ASSEMBLY AND METHOD
Filed Dec. 13, 1957
9 Sheets-Sheet 2
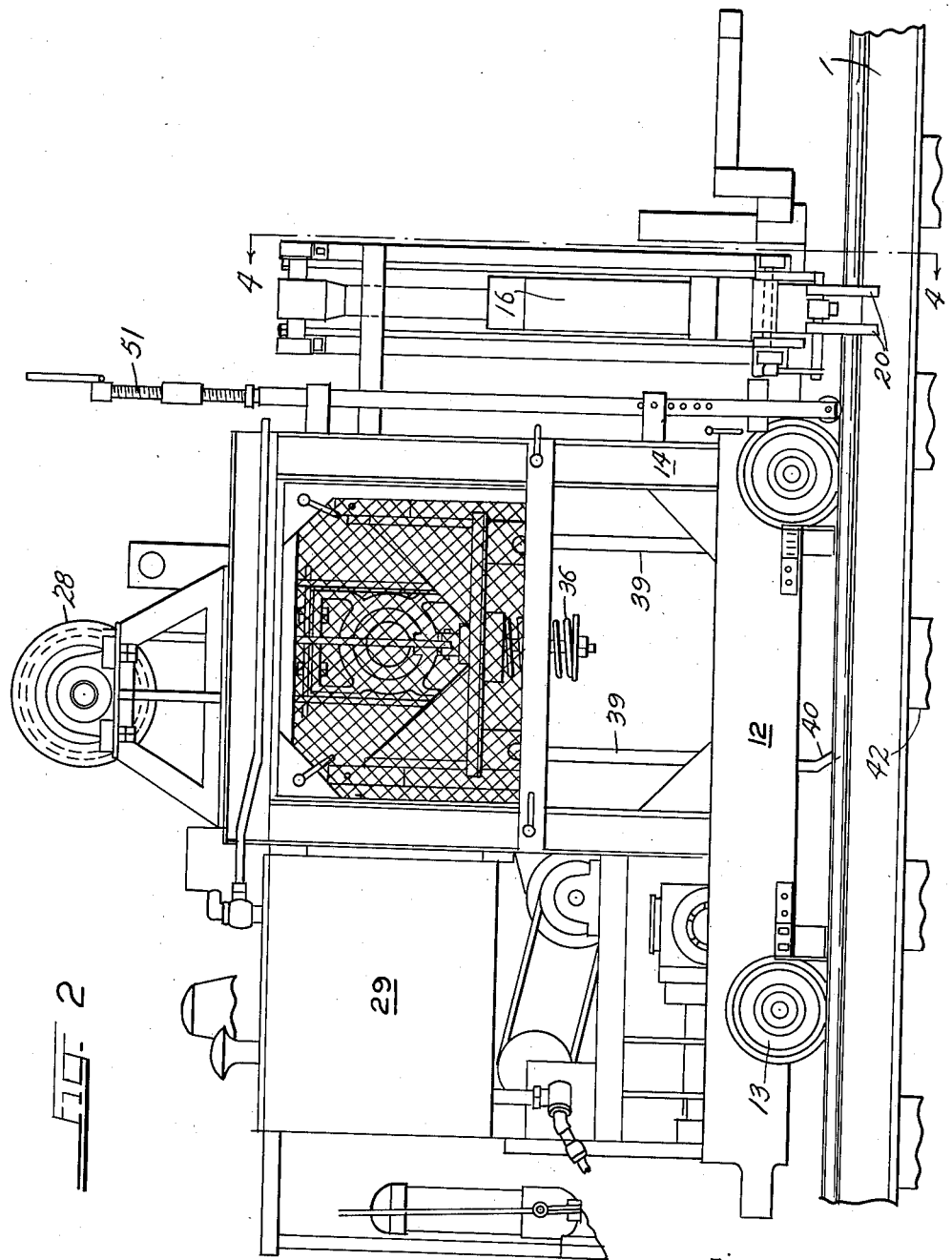
INVENTOR:
HENRY H. TALBOYS
BY
Parker and Carter
Att'ys.

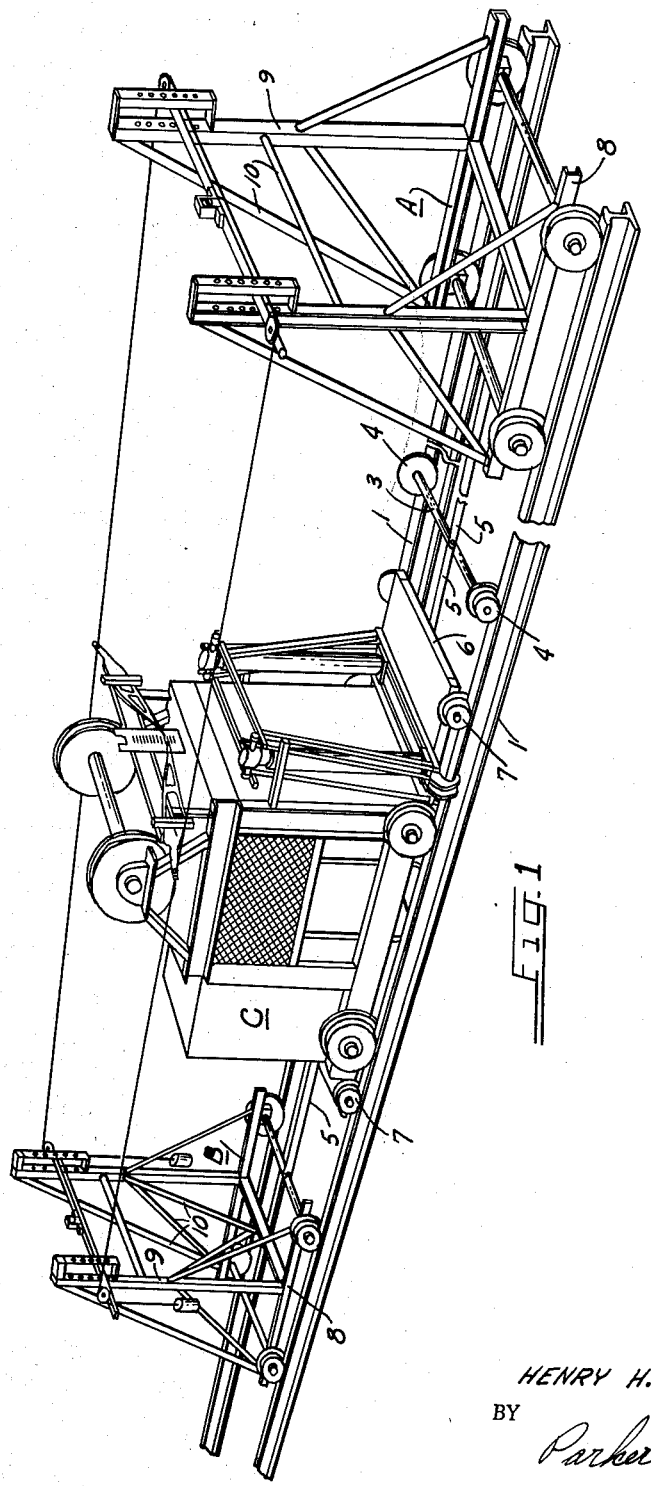

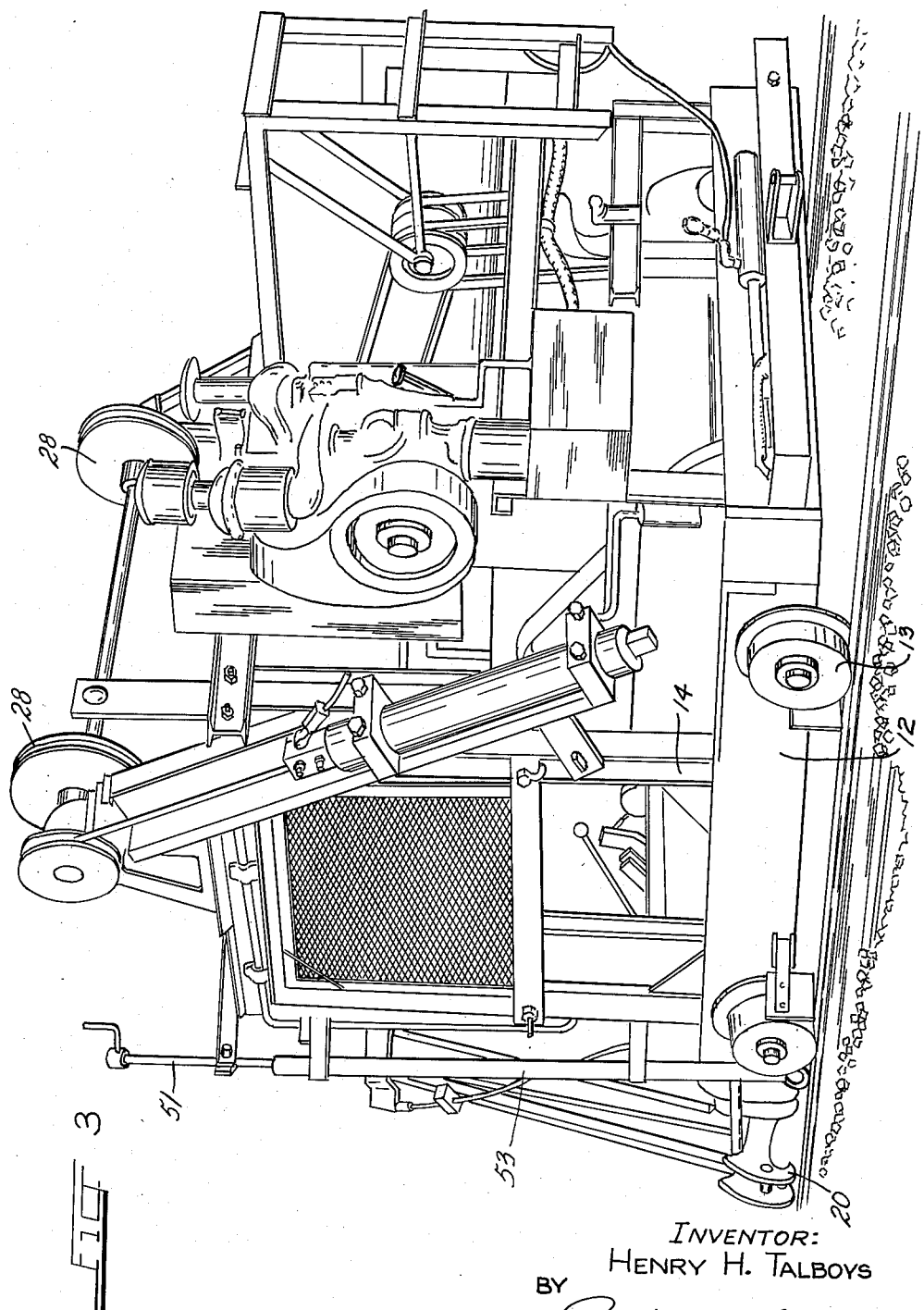

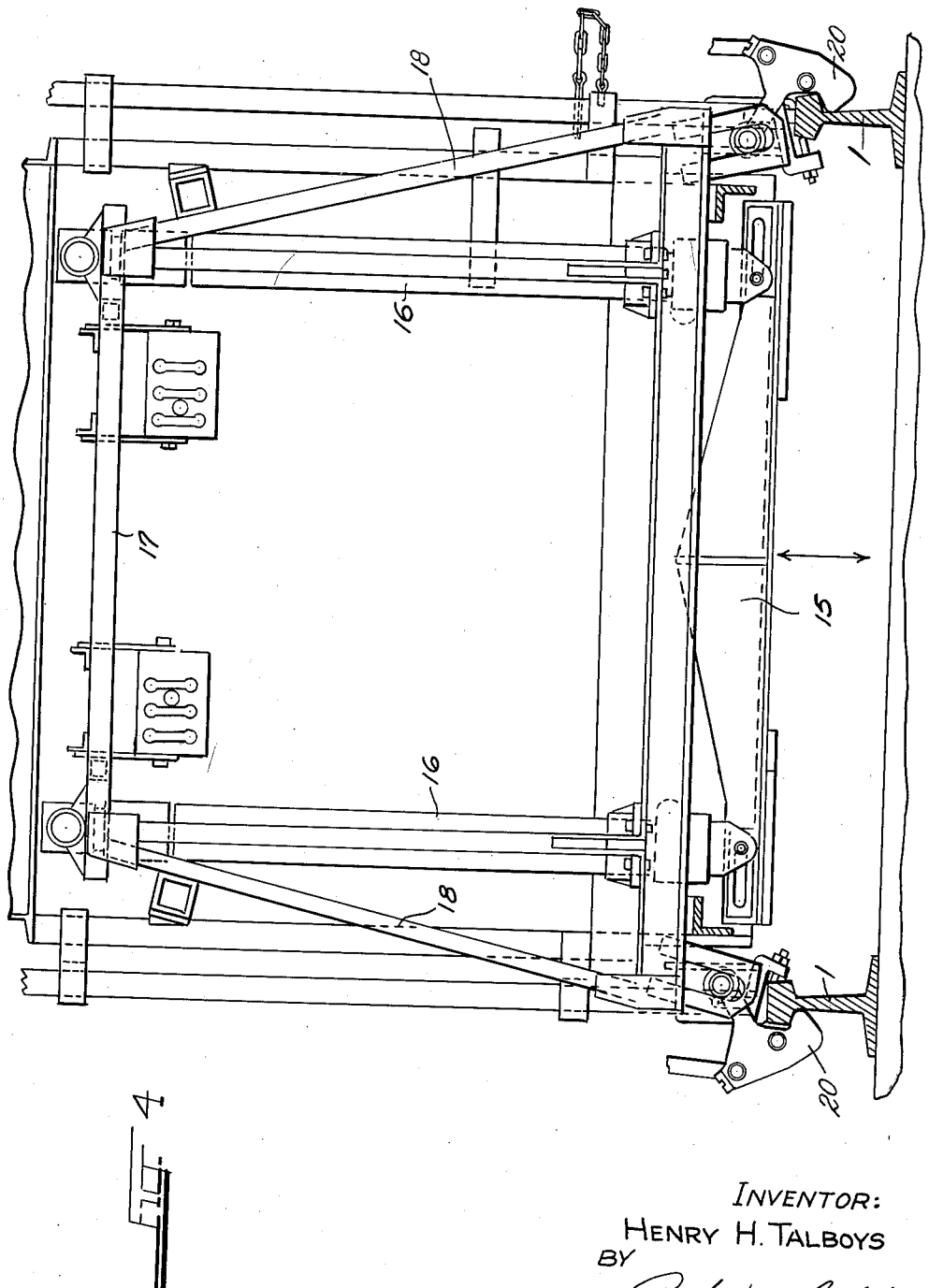

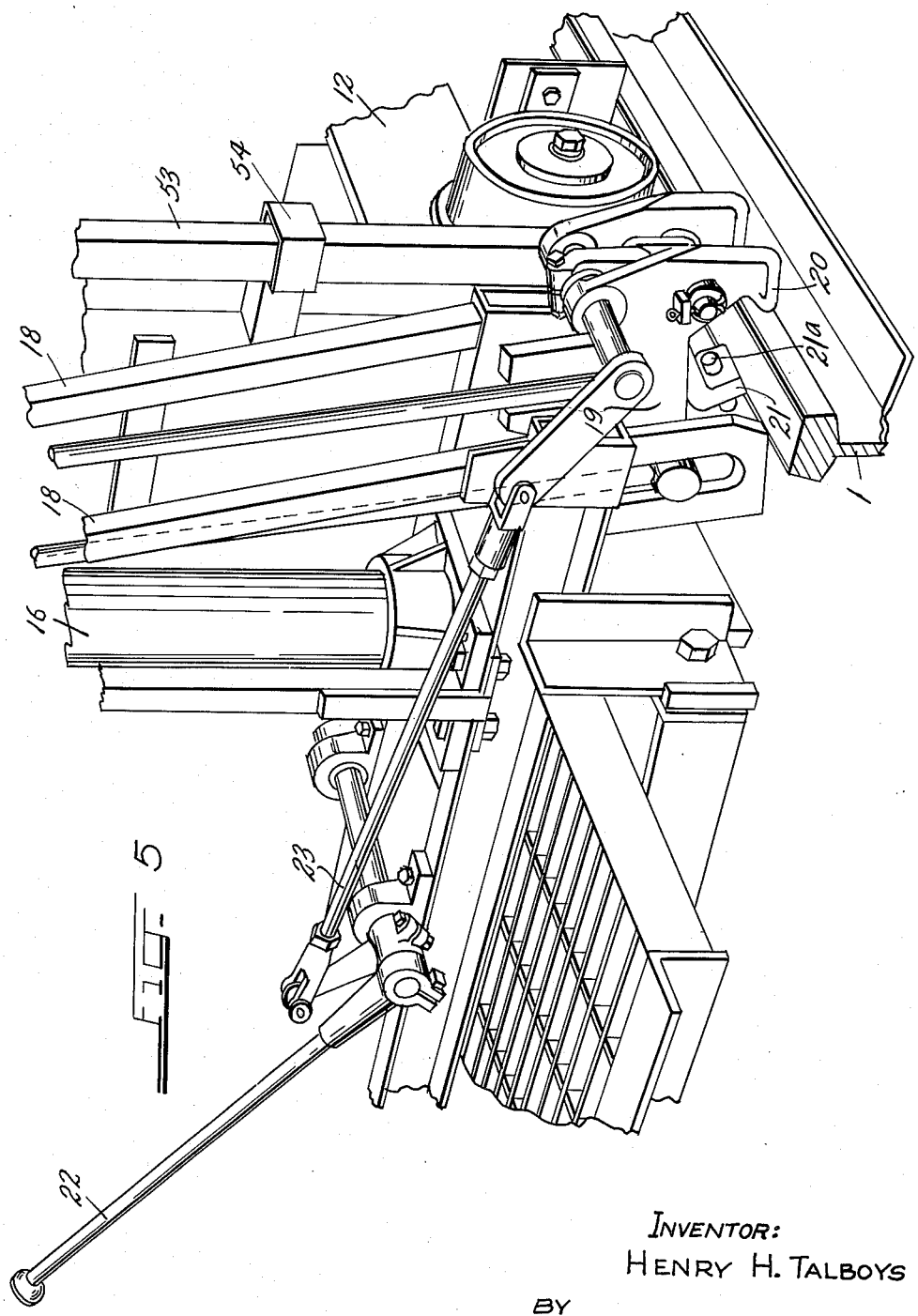

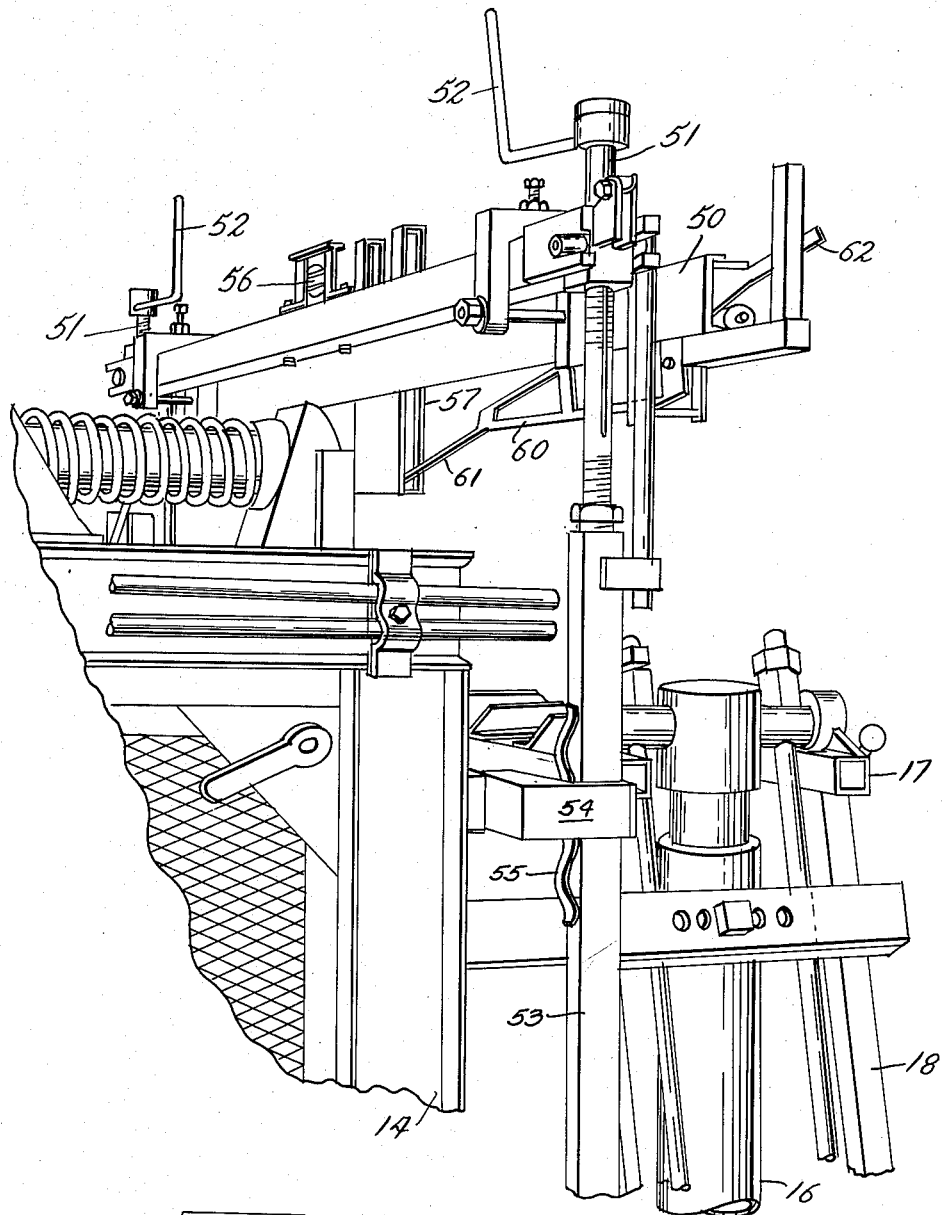

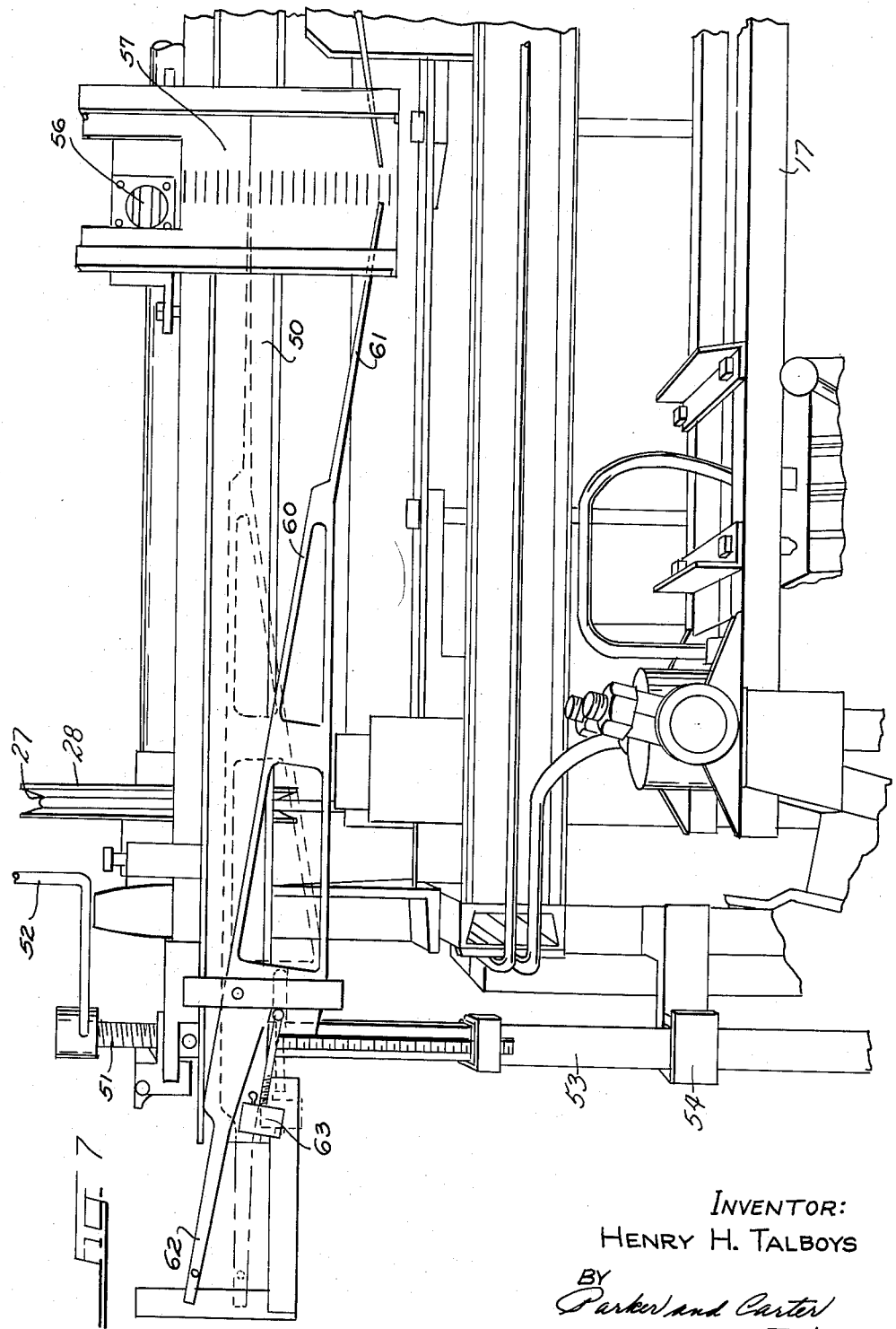

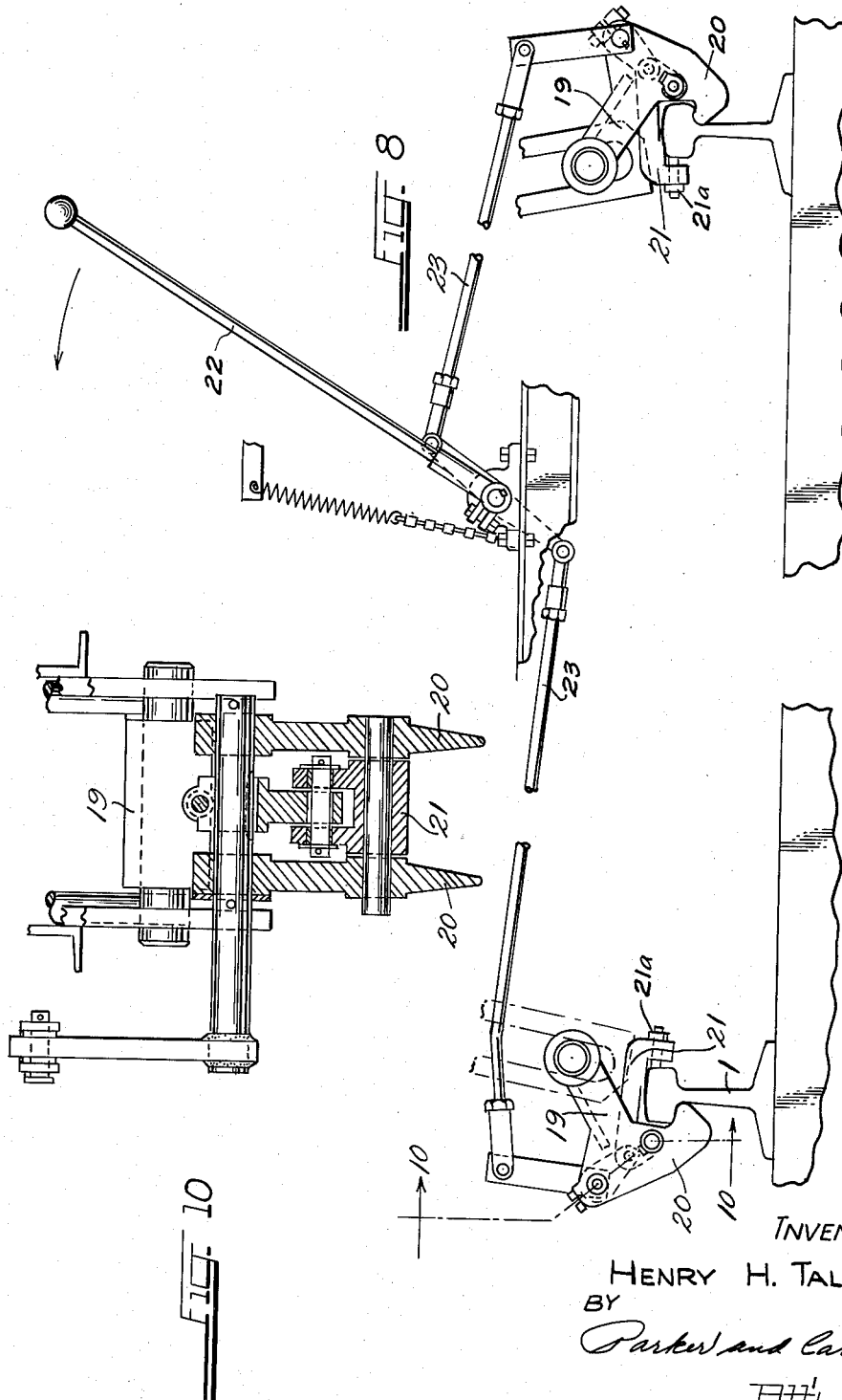

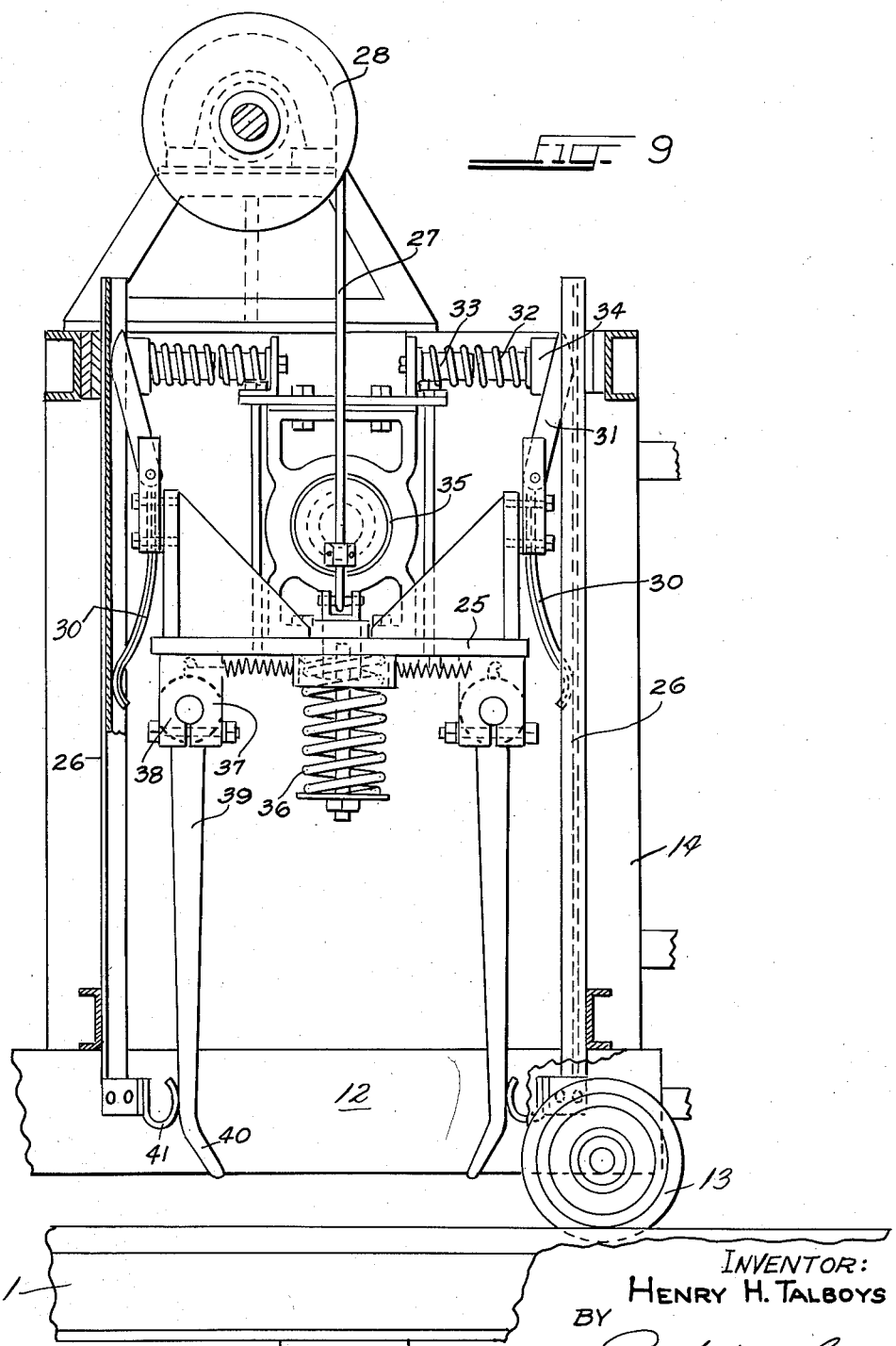

United States Patent Office
2,974,607
Patented Mar. 14, 1961

2,974,607
TRACK SURFACING ASSEMBLY AND METHOD

Henry H. Talboys, Milwaukee, Wis., assignor to Nordberg Manufacturing Company, Milwaukee, Wis., a corporation of Wisconsin Filed Dec. 13, 1957, Ser. No. 703,235
5 Claims. (Cl. 104—7)

My invention is in the field of trackworking methods and equipment. A primary purpose of my invention is to provide a track surfacing or track adjusting mechanism or assembly and method by which one or both rails of a track may be placed or adjusted in predetermined relation to a desired elevation or surface.

Another purpose is to provide a track surfacer assembly adapted to be mounted on and to move along the rails of a track.

Another purpose is to provide a method of positioning track rails to put the track in a desired elevation or surface or profile.

Another purpose is to provide a grade line or lines or a grade plane between stations, fixed or movable, spaced along a track, for use in track surfacing or raising.

Another purpose is to provide a mechanism for and method of resurfacing track, whereby track is raised or adjusted a predetermined amount to a predetermined surface or plane or profile.

Another purpose is to provide a method and means for determining and correcting high or low points in rails or track.

Another purpose is to provide a method and means for determining and recording information about track or rail conditions, for example, their relation to a predetermined reference plane or line or lines.

Assume that one rail is the grade rail, an important purpose is to provide means and method for bringing the opposite rail to a proper cross-level or elevation in relation to the grade rail, or in relation to a predetermined plane.

Other purposes will appear from time to time in the course of the specification and claims.

This application is a continuation-in-part of my application Serial No. 663,648, filed in the United States Patent Office June 5, 1957, now abandoned.

I illustrate the invention more or less diagrammatically in the accompanying drawings, wherein:

Figure 1 is a perspective view of a typical track operating assembly or team;

Figure 2 is a side elevation of a tamper jack which is the central unit of the team;

Figure 3 is a perspective view illustrating the tamper jack of Figure 2;

Figure 4 is a partial vertical section on the line 4—4 of Figure 2;

Figure 5 is a perspective view of a part of the jack and track clamping component, with the rail clamp in unlocked position;

Figure 6 is a partial perspective view illustrating the rail-height-controlling component of the system;

Figure 7 is a partial view, from a different direction, of the structure shown in Figure 6;

Figure 8 is a schematic view, in transverse section, illustrating the rail gripping component of the mechanism in operative position;

Figure 9 is a side elevation of the tamping component of the mechanism; and

Figure 10 is a detail of the clamping mechanism.

Like parts are indicated by like symbols throughout the specification and drawings.

Referring to the drawings, in Figure 1, 1 indicates the rails of a track. A and B generally, and more or less diagrammatically, indicate end carriages between which a wire is tensioned, or a plurality of wires are tensioned, to provide a wire or wires extending above the track, to define a plane of reference. C generally indicates a tamping power jack which may be used as a unit of a track or rail adjusting team.

While the details of the carriages are not of themselves critical, and while the details of the connections between the carriages and the tamper jack are not of themselves necessarily critical, I find it advantageous to provide a pair of carriages A and B spaced apart by a series of rail engaging cross-frames or cross-bars generally indicated at 3 and carrying flanged wheels 4 at each end. These are connected to each other and to the carriages by any suitable longitudinally extending members 5. I may find it advantageous to float the tamper jack within a surrounding frame supported on the rails by any suitable flanged wheels. Or, as shown in the drawings, it may be coupled directly in the train of cross frames 3. Thus the tamper jack must move in unison with the rest of the team whenever the team is moved along the rails.

Each of the end carriages may include a bottom frame 8, and upstanding side frame members or assemblies 9 connected by any suitable cross-pieces 10. While I am not herein illustrating the specific details of wire tensioning, which may be widely varied, it will be understood that an individual wire or wires may extend between the corresponding upwardly extending side frame members 9 of each carriage, these wires cooperating for example with the tamper jack C in a manner which will later be described in detail. I may employ two wires, or a single wire, guided to form two lengths. The wire or wires may be tensioned by weights, by springs, or by any other suitable means. When a single wire is employed, laid in parallel lengths, a single tensioning means may be employed. Likewise, I prefer to employ some suitable adjustment for raising or lowering, as I wish, the points of support of the wire or wires upon the carriages A and B, at one or both sides of the track. It is thought not necessary to illustrate such adjusting and supporting means in detail herein.

It will be understood that the wire or wires may be mounted and adjusted to define a plane of reference which serves as a guide in obtaining information about already laid track or in doing work upon the track to make it conform to a desired surface. Whereas I find the use of wires advantageous in establishing or defining such a plane of reference, it will be understood that I may employ other means, for example a projected beam, or beams, of light which may be directed toward photosensitive cells or the like. Considering, however, the use of the wires as a typical example, I may employ between the forward and rear carriages suitable mechanisms for measuring and/or recording conditions of the track and rails or for doing work upon the track and rails, based on such measurements and recording, or for doing work directly upon unmeasured track or rails.

As a typical application of my invention, I indicate herein a tamper jack located between the two end carriages and connected in train with them, as above indicated. Such a tamper jack may be used in connection with varying the surface of one or both rails in relation to the plane of reference defined by or established by the wires. The tamper jack may be employed in local surfacing operations or in connection with a general resurfacing of the track and rails. It will be understood that, in practice, one rail or both rails, at a given point along the track, may require work done upon them to conform to the desired track surface.

In the use of the track jack, I may employ the below-described structure for determining the desired level or surface of the track or rails upon which the track jack rests. Such indicating structure is shown, for example, in Figures 6 and 7 and is, for simplification, omitted from Figures 2 and 3.

Considering the tamping power jack in detail, it combines a jack component and a tie tamping component, with the further inclusion of means for locking the tamper jack to the rails.

Considering, for example, Figures 2 and 3, any suitable bottom frame 12 is supported upon the rails of the track by suitable flanged wheels 13. Any suitable frame 14 is mounted on or forms part of and extends upwardly from the base 12. In considering, for example, Figure 2, at the right end of the figure I illustrate the jack assembly or component and the track gripping component. The track gripping component also is shown in some detail in Figure 5, which shows it in inoperative position, and in Figure 8, which shows it in rail engaging position.

Figure 4 illustrates the relationship of the locking arrangement to the jack. The jack may include an abutment or shoe 15 formed and adapted to engage the surface of the roadbed between adjacent ties. It may be raised and lowered by any suitable hydraulic rams or the like, generally indicated at 16, 16. An upper frame or cross-portion 17 may be secured to the rails by downwardly and outwardly extending tension members or links 18. At the lower ends of these links are positioned the locking assemblies illustrated, in some detail, in Figures 5 and 8. Each such assembly includes a dog or latch lever 19 carrying at its lower, outer end a hook 20 positioned to extend inwardly beneath the upper flange or head of one of the rails. 21 is a cross-piece pivoted in relation to 20, provided with a rail engaging adjustment 21a and formed and adapted to overlie the rail flange and to engage its inner face. Any suitable operating leverage, including the handle lever 22 and the operating rods 23, may be employed, as shown in Figures 5 and 8, to move the locking elements 20 into and out of locking relation with the rail flanges. Assuming that the parts are in the position in which they are shown in Figure 8, then the jack structure of Figure 4 may be employed. By any suitable controls the hydraulic thrust elements 16 are expanded and force the shoe 15 downwardly against the ballast surface. However, the upper frame or cross-portion 17 is locked to the rails, as above described, and the result of a downward thrust of the abutment 15 is to tend to lift the rails and the ties upwardly in relation to the ballast, at the point or zone of application of force of the jack.

Considering, again, Figure 2, let us assume that the locking and jack assemblies are operating to hold the frame 12 locked in relation to the rails, with the rails being subjected to an upward pull. The tamper component of the tamper jack then may come into play. This component is shown, in some detail, in Figure 9, and includes a transverse platform or element 25 which may be raised and lowered between any suitable vertical guides 26 by a hoisting cable 27 passing over any suitable drum 28 and extending to a suitable power source, such as the engine diagrammatically indicated at 29. It will be understood that the operator may raise and drop the platform 25, it being more or less flexibly guided within the guides 26 by suitable guides. I illustrate, for example, leaf spring elements 30 and pivoted engaging arms 31. It will be understood, however, that the guiding mechanism may be widely varied, as long as it is adapted to permit the platform 25 and its associated parts to be raised and dropped. In the present instance, however, I illustrate the upper levers 31 as spring-thrust outwardly, for example, by coil springs 32, guided on suitable abutments 33, which direct a thrust outwardly against the upper end of the levers 31, for example, by suitable blocks 34. The platform 25 and the parts mounted thereon are subjected to a more or less orbital vibration, for example, by an unbalanced rotor assembly, not shown in detail but indicated more or less diagrammatically at 35. The unbalanced rotor and the means for rotating it do not of themselves form part of the present invention and will not be described in detail. It will be understood, however, that during the raising and dropping of the platform 25 and while it is in dropped position, a suitable unbalanced rotor is rotated at adequate speed to impart a high frequency vibration to the platform 25 and to the below-described tamping bars mounted on the platform. It will also be understood that to permit the platform to be raised and dropped, I provide suitable spring cushion means for the cable 27, including, for example, the spring 36.

Extending downwardly from the lower surface of the platform 25, I illustrate any suitable abutments or flanges generally indicated at 37, to which are pivoted tamping bars. Each such tamping bar includes an upper hub 38, a body portion 39, and a lower offset or bent end portion 40. As will be seen from Figure 9, the tamping bars are pivoted for limited rotation about horizontal axes generally perpendicular to the extension of the rails. The lower ends of the bars are engaged by any suitable yielding guides shown, for example, at 41 in Figure 9. As shown in Figure 9, the tamper jack is positioned with a pair of tamper bars being located one at each side of a tie indicated at 42. Assume that the platform 25 is dropped, it will be understood that the weight of the platform 25 and its associated vibrating mechanism and tamping bars is substantial. The ends of the tamper bars penetrate the surface of the ballast at each side of the particular tie 42. While I do not wish to be limited to any particular number of tamper bars, I find it practical to have a single pair of tamper bars at each end of the platform 25, one such bar being adjacent each of the rails of the track. An efficient arrangement is to have such bar located immediately within each rail. As the platform 25 is dropped, and as the tamper bars penetrate the ballast at each side of the tie 42, the rather violent vibration of the eccentric assembly 35 is imparted to the platform 25 and to the tamper bars, and they loosen the ballast at each side of the tie 42 and, to a substantial degree, beneath the tie. The opposing curvature or bending of the lower ends 40 of the tamper bars tends to cause them to travel toward each other and toward and beneath the tie 42. The bend or curvature of the lower end of the temper bars is sufficient to impart a loosening vibration to the ballast not only along but even, to some degree, beneath the tie. With a succession of such drops of the head and of the accompanying vibration, and with the operation of the jack, at the same time, continuing, it will be seen that the rails can be readily slightly lifted by the jack, and, with them, the ties to which they are secured, in connection with adjustments of level of the track.

It will not be necessary to go, in detail, into the power plant and its controls. It is sufficient to observe that a single power plant 29 may be employed, suitably connected to power the hoist for raising and dropping the platform 25 of the tamping component. At the same time, it may provide power for the hydraulically operated jack. It may also be employed to convey the tamper jack unit along the rail, either to move the entire assembly or team from place to place along the rails or to change the alignment of the tamping component from tie to tie during the progressive movement of the tamper jack along the track.

As above mentioned, the carriages A and B maintain a wire, or wires, aligned for example, along the opposite rails of the track. Whether the wires are aligned directly above the rails or at some predetermined location within or without the rails, is not critical, though I prefer to locate them outwardly beyond the rails. What is important is that the aligned wires are maintained at the opposite sides of the tamper jack assembly, and define a plane of reference to which the track and rail surface may be related. In adjusting or varying the surface of the rails, it is important that the operator of the tamper jack knows precisely "where he is." I therefore provide a close control by which the operation of the tamper jack may be kept under constant observation. This structure of control and observation is illustrated, in some detail, in Figures 6 and 7. This control structure may be dispensed with if a tamper jack is to be employed by itself and not as part of the above-described and above-illustrated team. However, assuming that the tamper jack is to be used with the team of wire aligning and supporting carriages A and B, the structure of Figures 6 and 7 may advantageously be employed.

Referring to Figure 7, a cross-piece or cross-structure, generally indicated as 50, may be adjusted vertically at one or both ends, as by the adjusting screw 51 and the operating handle 52. This adjustment controls the relation of the cross-structure to the vertical bars 53 movable in guides 54 and held against undesired rapid movement, for example by cramping springs 55. It will be understood that at the lower end of each vertical bar 53 a rail engaging roller may be positioned. The cross-piece 50 may carry a spirit level 56 and, as shown, carries also a suitable graduation 57, the purpose of which will later appear. Pivoted near each end of the cross-piece 50 is a pointer lever, generally indicated as 60, having an inner pointer 61 opposed to the graduate 57 and an outer lever 62 engaging one of the wires. The balance of the pointer lever 60 is preferably delicate, and may be adjusted, for example, by the adjustable counterweight 63, so that although the outer arm 62 bears against one of the wires, it does not exert sufficient upward thrust against the wire perceptibly to change the position of the wire. Thus the inner pointer 61 indicates the relation of the level of the wire to the level of the rail or track. As the tamper jack operates, and as one or another of the rails is raised, the position of the lever 60 varies, and the pointer 61, as it travels across the graduate 57, indicates the change of rail position or plane. It will be understood that one of the pointer levers 60 may be positioned at each end of the cross-bar or cross-assembly 50. It will thus be clear that the operator of the tamper jack, by observing the spirit level or the pointers, or both, will always know the progress made in changing the surface of the rail or rails.

The use and operation of my invention are as follows:

In a broad sense, I find it advantageous to provide or establish a plane of reference for track surfacing. I find it convenient to provide such a plane by tensioning two wires between a front and a rear buggy or carriage, A and B, the wires substantially defining, in effect, what may be a generally horizontal plane generally parallel longitudinally with the track but precisely horizontal across the track, at all times. Thus, the two wires, or their equivalents, extend in parallel along the rails of the track. I find it convenient to have the wires separated by a distance somewhat greater than the distance separating the rails, with each wire being substantially above and somewhat outside of the corresponding rail. With completed or normal track the plane of reference may be generally horizontal and generally parallel with the track surface extending above the properly surfaced track. On tangent sections, where the rails are straight, the rails lie in a uniform plane. It will be understood that when I talk of a plane of reference I do not mean that the plane is truly horizontal. Curved track may, of course, be somewhat tilted from the horizontal, but I do find it generally advantageous to have the plane truly horizontal in a cross-track direction.

In operations on track, one rail may be considered the grade rail. Let us say that the problem is to bring the opposite rail to proper cross-level or elevation in relation to the grade rail. In my invention I define the cross-level by employing the above-described two wires or their equivalent, to establish a plane of reference which is preferably horizontal, across the track. This plane of reference may be set and maintained by adjusting the supports on the front and back carriages.

It will be understood, of course, that whereas I teach the use of a wire or wires to provide the plane of reference, I may use other means. I may, for example, as above mentioned, find it advantageous to define such a plane by a system of light sources and photo-sensitive elements. However, I find it convenient to employ a single wire which starts on one carriage, is bent about the other carriage, over rollers or abutments, and returns again to the first carriage. In this fashion a single tensioning means or system may be employed to maintain a minimum and constant sag of the wire, whatever sag there may be being the same in both stretches of the wire. This is important in maintaining a true across-the-rail level of the reference plane.

Assuming that the plane of reference is established as above pointed out, I may employ an intermediate unit, such as the tamper jack earlier described, for adjusting or surfacing the rail. In my two-wire system the cross-bar of the tamper jack carries two pointers, each pointer being pivoted intermediate its ends, for rotation about a horizontal longitudinal axis. These axes are substantially nearer the outer ends of the pointer than the inner end. I may select, for example, a 3/1 ratio, whereby movement of the outer arm of the lever, in engagement with one of the wires, causes a 3/1 multiplication of the movement of the inner end of the lever, aligned across any suitable calibrated signaling means 57. By pivoting both pointers on a cross-bar structure, and by providing a uniform central scale, I can employ one or both of the pointers to obtain the desired adjustment of rail level. Assume that one rail, the grade rail, is at a proper elevation, and that its pointer, the pointer which engages the wire nearest that rail, is pointing at zero on the scale; then the other rail may be brought to proper elevation by doing work on the track or rail until the second pointer is also at zero. The cross-bar on which both pointers are mounted is initially adjusted to put each end of the cross-bar at the same distance above the underlying rail. Where the rails are to be at the same level, the cross-bar is horizontal when the rails have been leveled, with the horizontal cross-bar level when both pointers are at zero. The cross-bar is leveled, with a spirit level, and the high rail is measured with the scale C on the bars 53. But assume that one of the rails is to be elevated in relation to the other. In that case, the cross-bar is adjusted to be level when the rails are at the desired relationship. As the rail is elevated the cross-bar end above the rail is elevated; but when the second rail pointer is at zero, and the cross-bar is horizontal, the rails lie at a different level. The distance between the top surface of the grade rail and the cross-bar is greater than the distance between the other rail and the cross-bar. But the cross-bar is leveled, and both pointers are at zero, when the desired elevation has been given to the rail opposite to the grade rail.

Since there is, inevitably, some sag in a mechanical system of wires and the like, I must provide some suitable adjusting means for adjusting the cross-bar to compensate for sag. The use of a photoelectric system makes such adjustment unnecessary.

In practice, in the use of my invention, I operate along a track in a series of advances. The front carriage A is on track or rails not yet adjusted or surfaced. The rear support or carriage or buggy B is on already raised or surfaced track. The amount of lift desired is governed by a higher setting of the front support in relation to the rail. The tamper jack or other piece of trackworking or measuring equipment may be, and generally is, positioned nearer the rear carriage than the front. I find it practical to have the distance between the carriages generally five times the distance between the rear carriage and the trackworking unit, because this relationship minimizes 5 to 1 any track variations on which the front carriage may rest. With the grade rail already up to zero, the other rail may be leveled in relation to it. In this leveling process I may employ the spirit level 56 shown in Figure 7, or I may employ the pointer 61 itself. When the pointer zeroes, the other rail is leveled to the desired level, assuming that the cross-bar was properly adjusted.

I find it advantageous to have a system in which the plane of reference extends across the tracks, or in which two wires are used. This system is particularly helpful in dealing with curves, because curves can go in either direction, and the low or inside rail is generally the grade rail. With my two-wire system I have a wire available, whichever rail is the grade rail. On curves, the outer rail has to be higher than the inner rail. The elevation varies with the sharpness of the curve, the weights of trains passing over the curve, and the speed at which trains pass. On a curve the cross-bar is kept level and the high rail is brought up to the proper elevation, for example, by the use of the tamper jack above described.

Whereas my system and method are advantageously applied to actual track surfacing employing jacking and tamping means, it will be understood, of course, that in the place of using a tamper jack, or of actually operating on the track, I may substitute any suitable observing, measuring, indicating and recording mechanisms. In that event, as I move my assembly along the track, I can make a precise record of rail conditions and rail elevation, which is available for use in work on the track, either then or later. In that event, the wire on the front carriage can be at the same level as the wire on the rear carriage, and the intermediate element is used merely to read deflections of one or both rails from the desired level or plane.

It will also be understood that the tamper jack unit herein described and shown need not necessarily be employed in connection with the wires or plane of reference above described. The tamper jack, without the use of wires or of the mechanism of Figures 6 and 7 for engaging the wires, has independent utility in the field of trackworking operation. Also, it is merely one of a variety of trackworking units which may be used in the herein-described system.

My method and structure are capable of a substantial breadth of use. With reference for example to Figure 1, I find it advantageous to provide for a transverse adjustment of the wire lengths since, as the team passes about a curve, the inside wire in its intermediate length may be at a substantially increased distance within the curve. In order to maintain proper contact between the wire and the indicating mechanism of the tamper jack unit, the pulleys about which the wire passes, or the supports upon which the pulleys are maintained may, one or both of them, be laterally adjusted, in order to bring that part of the wire which is engaged by the indicating mechanism to substantially the same distance from the rail as it is on a tangent length of track.

I claim:

1. In a track surfacing mechanism, an assembly of spaced carriages constructed to be moved along the rails of a track, means on the carriages for establishing a generally horizontal longitudinal plane of reference above and generally parallel to the rails and extending laterally across the rails, a jack in the assembly for independently lifting the rails at any designated location in accordance with the distance of the rails from the plane of reference, and a sensing mechanism at the jack for directly detecting the distance between either rail and the plane of reference to establish the amount of independent lift.

2. The structure of claim 1 further characterized in that the plane establishing means includes at least two tension wires laterally spaced a substantial distance apart and disposed longitudinally along the assembly the same distance above the rails and parallel to each other.

3. The structure of claim 1 further characterized in that the plane establishing means includes a single wire looped around the assembly and doubled back on itself defining two longitudinally disposed, laterally spaced reference lines, the lines being disposed on opposite sides of the assembly and at the same height above the rails, one line being generally above each of the rails.

4. The structure of claim 1 further characterized by and including means on the carriages for adjustably tilting the plane of reference longitudinally of the track.

5. The structure of claim 1 further characterized by and including two longitudinally disposed, laterally adjacent reference lines defining the plane of reference and extending between the carriages.

References Cited in the file of this patent

UNITED STATES PATENTS

| | | |
|---|---|---|
| 1,096,357 | Dupes | May 12, 1914 |
| 1,599,622 | Piersaull | Sept. 14, 1926 |
| 1,616,084 | Guillet | Feb. 1, 1927 |
| 2,412,463 | McDaniel | Dec. 10, 1946 |
| 2,505,606 | Coffey | Apr. 25, 1950 |
| 2,538,145 | Christopulos | Jan. 16, 1951 |
| 2,734,463 | Hursh et al. | Feb. 14, 1956 |
| 2,814,119 | Grossmann | Nov. 26, 1957 |

FOREIGN PATENTS

| | | |
|---|---|---|
| 19,769 | Australia | Oct. 1, 1929 |
| 753,519 | England | July 25, 1956 |
| 657,880 | France | Jan. 29, 1929 |
| 40,361 | Sweden | Mar. 15, 1916 |

OTHER REFERENCES

Norberg's Progress Magazine, 4th quarter, 1956, pp. 10 and 11. (Copy in Div. 34, Class 104–7.)

Eberhard Schubert, German application Ser. No. Sch. 13,121, printed August 2, 1956 (Kl.19a29$_{02}$), 3 pages spec.; 1 sht. dwg.